Jan. 16, 1934.  F. L. PORTER  1,943,623
DECORATIVE REFLECTIVE ARTICLE
Filed July 23, 1932
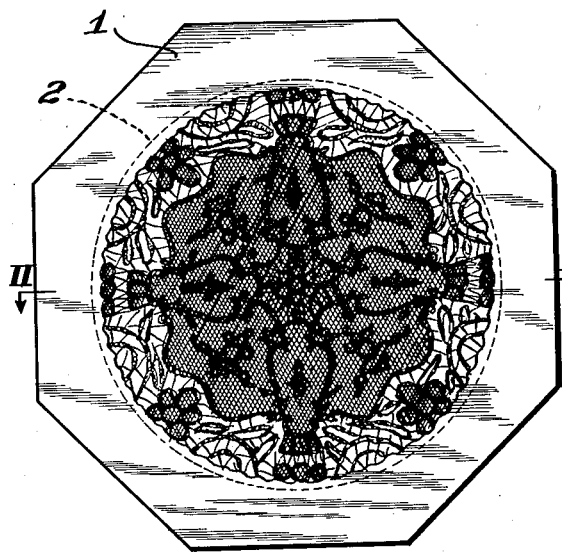
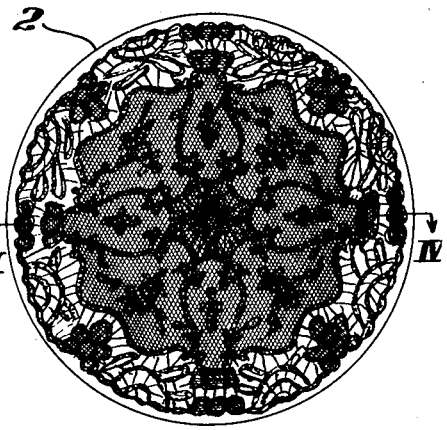
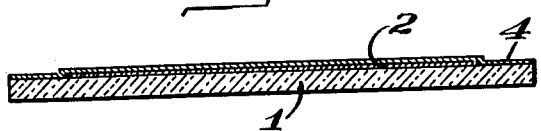
INVENTOR Patented Jan. 16, 1934

1,943,623

UNITED STATES PATENT OFFICE 1,943,623

DECORATIVE REFLECTIVE ARTICLE

Francis Logan Porter, High Point, N. C., assignor to Logan Porter Mirror Company, a corporation of North Carolina Application July 23, 1932. Serial No. 624,171

4 Claims. (Cl. 41—22)

The invention relates to ornamental, reflective articles, such as mirrors, plaques, and the like, and has for its objects the provision of an article of improved appearance, and one which may be produced at a low cost. The invention is illustrated in the accompanying drawing, wherein:

Figure 1 is a front view of the article. Fig. 2 is a section on the line II—II of Fig. 1. And Figs. 3 and 4 are detail views of the regenerated cellulose sheet forming part of the article, Fig. 4 being a section on the line IV—IV of Fig. 3.

Referring to the drawing, which illustrates an ornamental glass plaque made in accordance with the invention, 1 is a transparent glass plate and 2 is a sheet of a special form of transparent regenerated cellulose, known as cellophane. This sheet is much thinner than ordinary paper and has printed on one side the ornamental design 3. As shown, this is an openwork design in white constituting a reproduction of a lace pattern, but it will be understood that the design or pattern is capable of wide modification, and that various colors may be employed. Cellulose of this type has highly polished surfaces. The sheet 2 is pasted to the glass by any suitable cement, such as gelatin or casein, the printed side of the sheet going next to the glass. The article is now ready for its reflective coating, which is preferably formed in the same manner that mirror coatings are formed by precipitating a metallic film 4 over the back of the sheet 2 and over those portions of the back of the glass plate which are not covered by the cellulose sheet. This completes the commercial article, except for the addition of protective means for the silver such as a coat of shellac or copper plating which are not shown.

The article as thus formed is relatively cheap, as compared with other forms of decorated glass plates, and has a very striking appearance due to the backing of silver which surrounds the design and shows through the openwork design. This is particularly effective in those cases in which the design is a pattern of lace. The article is not limited to silver as other metallic coatings, such as gold, copper or lead sulphide, may be employed. The metal film over the rear face of the cellulose sheet is highly reflective due to the fact that the surface on which such metal is deposited is highly polished. For this reason the printed or ornamented surface of the sheet 2 is placed toward the glass sheet so that the other more polished face receives the metal. The cellulose is relatively non-absorbent so that the solution which is applied in silvering does not penetrate to the pattern or affect it in any way.

The cellulose sheet may cover more or less of the glass plate depending on the article. If the article is a plaque, the design will cover the major portion of the plate ordinarily, while in the case of a mirror for ordinary use, the design will usually cover only a small part of the glass plate and will be disposed at the edges of the plate instead of the center.

What I claim is:

1. A decorative reflective article comprising a glass plate, a sheet of thin transparent regenerated cellulose carrying an ornamental design cemented to the rear face of the plate, and a metallic film covering the rear face of the sheet.

2. A decorative reflective article comprising a glass plate, a sheet of thin, transparent regenerated cellulose cemented thereto having an ornamental design on its face next to the glass and having its rear face polished, and a precipitated metallic film covering the rear face of the sheet.

3. A decorative reflective article comprising a glass plate, a sheet of thin, transparent regenerated cellulose carrying an ornamental design cemented to the rear face of the plate, and covering only a part of said face, and a precipitated metallic film covering said sheet and the uncovered part of said face.

4. A decorative reflective article comprising a glass plate, a sheet of thin, transparent regenerated cellulose cemented thereto having an ornamental design on its face next to the glass and having its rear face polished, said sheet covering only a part of the face of the glass plate, and a precipitated metallic film covering the rear face of the sheet.

F. LOGAN PORTER.